3,148,122
WATER-INSOLUBLE WHOLE POLLEN COMPLEX AND METHOD OF MAKING SAME
Margaret B. Strauss, New York, N.Y., assignor to Miles Laboratories, Inc., Elkhart, Ind., a corporation of Indiana
No Drawing. Filed Jan. 27, 1960, Ser. No. 4,895
15 Claims. (Cl. 167—78)

The present invention relates to prophylactic and therapeutic treatments of allergies, and more particularly to processes for producing allerginic pollen extracts, and the antigenic compositions thus produced.

It is well known that many plant pollens serve as the source of principles, the precise nature and the chemical composition of which are not as yet fully understood, which display a high degree of physiological activity, and which are capable of producing certain forms of the allergy syndrome in sensitive individuals. These principles are commonly known as allergens.

The present invention relates to allergens which produce allergic reactions, such as hay-fever or asthma, and is quite generally applicable to pollens whether derived from weeds, grasses or trees.

Numerous attempts have been made in the past at using pollens in the therapeutic treatment of existing allergic states, and in the prophylaxis of allergies by eliciting an immunologic response whereby to forestall or at least minimize the effects of an acute attack. In the course of these investigations, a large variety of extracts, containing or believed to contain all or at least the major part of the active components, were tested, and some of these were marketed.

Most common pollens contain considerable quantities of water-immiscible oil. Because of the presence of this water-immiscible oil, extraction of the whole pollen with aqueous extracting fluids results in turbid solutions. Doctors object to turbid solutions, as they are not readily distinguished from contaminated preparations. Therefore, it was suggested at an early stage of allergy research that the oily substances be removed with ether, and ever since Stull and his associates, in their preliminary report entitled "Chemical and Clinical Studies on Pollen," J. Allergy 1: 470 (1930), recommended the removal of fatty material from the pollen to facilitate aqueous extraction, defatting of the pollen prior to extraction has been adopted as a standard procedure in this field. While on occasion lip service was rendered to the alternative of using pollen extracts, from which the oily constituent had not been removed prior to extraction, no process for extracting the oil fraction along with the other active principles was developed, and the adoption of a defatting procedure as a prerequisite for subsequent extraction has dominated the art for the last 20 years.

The adoption of this procedure is difficult to explain considering the work done by certain investigators, who established, as early as 1930, that there is an allergenically active constituent in pollen oil. Also, it has been suggested that the active component of pollen is a flavonol-carbohydrate-proteose complex. Consequently, the usual defatting and dehydrating procedure preceding aqueous extraction not only eliminates the active oil fraction, but also would tend to break the afore-noted complex by removal of the flavonol and by denaturization through dehydration, would lead to a changed antigenic component (proteose) in aqueous solution. Seeing that none of the great variety of pollen extracts proposed, and to some extent marketed over the years, proved entirely satisfactory for purposes of therapy and prophylaxis, it should have seemed logical to pursue the investigations in the direction of utilizing the whole pollen grain, including the oily component, while abstaining from any treatment of the pollen which might harm or transform any active component thereof, but this was not done until the present invention was conceived. This failure no doubt was caused by a number of factors, the principal one, most likely, being the absence of any agent whereby an extract could be prepared from the whole pollen grain which did not give a murky solution that rapidly turned oily with a gummy residue and without a danger of introducing into the extract toxic or otherwise undesirable components apt to result in harmful side effects.

It is a principal object of the present invention to fill this gap left by the prior art, and to provide a method and a composition whereby the whole pollen grains are utilized for the purpose of preparing an extract for therapeutic and prophylactic use in the treatment of allergies.

It is a further object of this invention to prepare allergenic extracts from whole grain pollens, whether derived from weeds, grasses, or trees.

It is another important object of this invention to prepare whole grain pollen extracts in a form lending itself to simple standardization and easy administration even to very sensitive persons.

A still further object of the invention is the preparation of an allergenic pollen extract distinguished by critically improved characteristics.

Yet another object of the present invention is the provision of an allergenic pollen extract whereby to eliminate itching of the eyes and nose, frequently a most irritating symptom of patients suffering from hay-fever and the like.

Other objects, and the manner in which the same are attained, will become apparent as this specification proceeds.

The present invention contemplates the preparation of an allergenically active product for use in the therapy or prophylaxis of allergic conditions by extracting the whole pollen grains with an extracting liquid containing a weak organic base, and more especially a heterocyclic tertiary amine such a pyridine, lutidine, quinoline, or the like and an aqueous medium, usually a saline solution, the organic base and the aqueous solution being preferably used in equal parts.

In accordance with the basic principles underlying the present invention, it has been established that extracting liquids, composed as outlined above, succeed in extracting both the oil fraction and the proteinaceous components, including water soluble proteins, polypeptides and proteoses, from the whole grain pollen material. While the precise mechanism is not yet fully understood, most of the active fractions in the pollen are believed to contain a large variety of dicarboxylic amino acids and the weak tertiary base, such as pyridine, may chemically combine with these terminal groups forming loose combinations. Link compounds of the heterocyclic tertiary amine with the flavonol of the flavonol-carbohydrate-proteose complex may be formed, or a quaternary pyridinum salt of similar salt derived from a weakly basic heterocyclic amine may be formed by reaction with an acid component of the oily fraction.

It is further within the purview of this invention to treat the whole pollen grain extract prepared by extraction with a pyridine or the like containing extracting liquid, with alum or the like, to cause precipitation of an allergenically active water-insoluble whole pollen complex.

The process according to the present invention is applicable to all pollens, and particularly, all pollens known to satisfy the well-known criteria, such as presence of a hay-fever or asthma excitant, abundant occurrence and wide-spread wind-borne distribution. Among the pollens successfully treated by the present process, and successfully converted into an allergenically active water-insoluble whole grain pollen complex found effective in the prophylaxis and therapy of hayfever and asthma, have been weeds, grasses, and trees, and more particularly high ragweed, low ragweed, plantain, timothy grass, orchard grass, ash tree, beech tree, birch tree, elm tree, oak tree, hickory tree, poplar tree and maple tree.

The pollen may be extracted by the process of the present invention within a wide range of concentrations; a range of concentrations of about 3 to about 18 percent is preferred. In other words, from about 3 to about 18 grams of pollen may be allowed to extract with 100 ml. of the extracting liquid according to the invention, e.g. an extracting liquid composed of equal parts of pyridine and 0.3 percent aqueous sodium bicarbonate solution.

The extracting liquid contains an aqueous portion which may be plain distilled water but preferably, is a saline solution. While an aqueous 0.3% bicarbonate solution is particularly preferred, an N/10 sodium hydroxide, 0.9% sodium chloride or 5% dextrose solution may be used to equal advantage, the percentages of course being merely illustrative.

The extraction may proceed at room temperature or at ice box temperatures, with or without agitation. The extraction treatment yields a solution containing the reaction product of the weak tertiary base, such as pyridine, with the physiologically active allergenic principles of the pollen, including the important oil fraction thereof.

The novel antigenic whole pollen complexes according to the present invention are obtained by treatment with alum or the like. Thus, when e.g. 5 grams of pollen have been allowed to extract with 100 ml. of an e.g. pyridine-bicarbonate solution, e.g. twenty-four hours, the extract is filtered off and subsequently sterilized, e.g. by Seitz-filtration. The 5 percent pyridine-bicarbonate pollen extract is combined with an equal volume of sterile distilled water, and then the same quantity of a solution of sterile 2 percent potassium aluminum sulfate in ¼ N sulfuric acid is added slowly with mixing causing precipitation of an allergenically active water-insoluble whole pollen complex.

The precipitate and solution may be allowed to stand whereafter the mixture may be centrifuged and the supernatant fluid discarded. The residue may be washed repeatedly with sterile saline solution and the final volume of this suspension may be made up to a volume equal to the initial volume of the 5 percent pyridine-bicarbonate pollen extract used.

This product is substantially insoluble in water, exhibits antigenic activity of a very high order and is readily suspended in isotonic saline solution for administration by injection in the prophylactic and therapeutic treatment of asthma and hay-fever. The allergenic activity of the product is not materially affected by storage at room temperature even over long time periods.

The present suspensions lend themselves to standardization by a weight method which takes into account all antigenic fractions present, including the oily fraction previously removed prior to the preparation of an aqueous extract.

The novel allergenic products according to this invention are non-toxic and are non-irritating, as established by a series of tests conducted as follows: 12 individuals (randomly selected), having no previous history of hypersensitivity, were administered subcutaneous injections of this product in various dilutions without any detectable, local or systemic reactions.

The stability of the novel antigenic products of this invention was demonstrated by tests upon rabbits. An alum precipitated pyridine ragweed extract, which had been stored at room temperature for 3 years, produced precipitins in rabbit sera, as demonstrated by ring precipitin tests against a fresh aqueous ragweed extract.

The present water-insoluble whole grain pollen extracts are distinguished by a vastly decreased rate of absorption compared with the standard aqueous defatted pollen extracts. This may be illustrated by reference to passive transfer tests which were performed on six suitable normal non-sensitive adults with ragweed-sensitive sera sites, using an ordinary aqueous ragweed extract and the novel water-insoluble whole grain ragweed extract according to this invention. The time interval and degree of reaction at the passive transfer sites were noted, and it was determined that there was a very material decrease (threefold or more) in the rate of absorption of the present product over the absorption of the ordinary aqueous ragweed extract.

The novel allergenic products according to this invention are non-toxic and non-irritating, and are materially more effective than the products heretofore available for the prophylactic and therapeutic treatment of asthma and hay-fever.

A group of 78 ragweed hay-fever patients, highly sensitive to pollen, were treated with a whole grain ragweed extract prepared in accordance with the present invention, over a three-year period. The patients selected for treatment with the present suspension consisted of those who were unable to undergo satisfactory treatment with aqueous extracts because of their marked degree of sensitiveness. A dosage schedule with a reduced number of injections was generally followed since a greater tolerance for this new suspension was noted, and longer intervals between dosages were found feasible. No local induration, irritation dermatitis, or toxic effects were observed with any of these 78 highly sensitive patients.

Another group treated with the novel whole grain ragweed complex obtained according to this invention, consisted of 84 patients, all of whom had a previous history and a positive reaction to skin tests for ragweed induced hay-fever. Of this group, 70 patients or 83% had eye symptoms, 75 patients or 90% had coryza, and 47 patients or 56% had asthma. Twenty-eight patients or 33% had had no previous treatment, 32 patients or 38% had had treatment for 1–3 years, 7 patients or 9% for 3–5 years, 8 patients or 10% for 6–10 years, and 9 patients or 11% had had treatment for 10 or more years. More than one-half of these patients were established, by skin test, to be of the Class A type, i.e., markedly sensitive. Among those patients previously treated with an ordinary aqueous ragweed extract, 45 patients had displayed no systemic reactions; 13 patients had had 1 systemic; 14 patients had experienced 2 systemics; 7 patients had shown 3, 1 patient 4, and another patient 5 systemic reactions. Three patients had had 6 systemics, and 1 patient had had 24 systemic reactions.

In contrast to these results of the past treatment, in all of the 84 patients treated with the novel antigenic product of the present invention, only 1 systemic reaction was noted.

Also, the top dosage of the present product was very much greater than that of the ordinary aqueous ragweed extract previously administered, the top dosage of the latter having been 200 u./cc. for Class A patients, and 2000 u./cc. for Class B patients, whereas the top dosage of the novel water-insoluble whole grain ragweed extracts of the invention amounted to 3000 u./cc. for Class A patients, and 5000 u./cc. for Class B patients.

Excellent immunological results were observed in the pre-seasonal, prophylactic treatment of 94 patients with the novel water-insoluble whole grain ragweed extract of the invention, where in the course of treatment from March to June, dosages of as high as 5000 u./cc. were tolerated and no constitutional reactions were observed; the repression of symptoms during the hay-fever season was substantially complete in all cases.

The methods and products according to the invention are illustrated by the following examples, but I wish it to be understood that these examples are intended to illustrate rather than limit the present invention.

*Example I*

Five grams of high ragweed pollen were extracted with 100 ml. of an extraction liquid consisting of 50 ml. of pyridine and 50 ml. of aqueous 0.3 percent sodium bicarbonate solution, for 24 hours at room temperature. The extract was filtered off and then Seitz-filtered for sterilization. Under sterile conditions, 40 ml. of the 5 percent pyridine-bicarbonate ragweed extract thus obtained were combined with 40 ml. of sterile distilled water, and to this mixture, 40 ml. of an 0.25 N sulfuric acid solution containing 2 percent by weight of sterile potassium aluminum sulfate were added slowly, with continuous agitation. The reaction product was obtained in the form of a voluminous precipitate brown in color, which is an allergenically active water-insoluble whole grain ragweed complex. The precipitate and solution were allowed to stand overnight at 5° C., whereupon the mixture was centrifuged and the supernatant liquid was discarded. The residue was washed three times with large quantities of sterile saline solution, sterile glass beads being used to separate the finely divided particles of the precipitate and to facilitate washing. The precipitate was then suspended in isotonic solution, the final volume of this suspension being made up to a volume equal to the initial volume of the 5 percent pyridine-bicarbonate ragweed extract used. The suspension of this product in isotonic saline solution was used for administration by injection.

*Example II*

The procedure described in Example I was repeated with the exception that 5 grams of low ragweed pollen were extracted with 100 ml. of the extraction liquid composed of 50 ml. of pyridine and 50 ml. of aqueous 0.3 percent sodium bicarbonate solution, for 24 hours at room temperature. This extract was further processed as in Example I and yielded a product similar to that described therein, which, when suspended in isotonic saline solution, was found to be useful for administration by injection.

*Example III*

The procedure described in Example I was repeated with the exception that 5 grams of a mixture of equal parts of high ragweed and low ragweed pollen were extracted with 100 ml. of the extraction liquid composed of 50 ml. of pyridine and 50 ml. of aqueous 5% dextrose solution, for 24 hours at room temperature. This extract was further processed as in Example I and yielded a product similar to that described therein, which, when suspended in isotonic saline solution, was found to be useful for administration by injection.

*Example IV*

The procedure described in Example I was repeated with the exception that 12 grams of a mixture of equal parts of high ragweed and low ragweed pollen were extracted with 100 ml. of an extracting liquid composed of 50 ml. of quinoline and 50 ml. of aqueous 0.9 percent sodium chloride solution, for 24 hours at room temperature. This extract was further processed as in Example I and yielded a product similar to that described therein, which, when suspended in isotonic saline solution, was found useful for administration by injection.

*Example V*

The procedure described in Example I was repeated with the exception that 3 grams of a mixture of equal parts of high ragweed and low ragweed pollen were extracted with 100 ml. of an extracting liquid composed of 50 ml. of lutidine and 50 ml. of N/10 sodium hydroxide solution, for 24 hours at room temperature. This extract was further processed as in Example I and yielded a product similar to that described therein, which, when suspended in isotonic saline solution, was found useful for administration by injection.

*Example VI*

The procedure described in Example I was repeated except that plantain pollens were substituted for the ragweed pollen described therein. The extract was further processed as in Example I and yielded a product similar to that described therein, which, when suspended in isotonic saline solution, was found useful for administration by injection.

*Example VII*

The procedure described in Example I was repeated with the exception that 12 grams of timothy grass pollen were substituted for the 5 grams of high ragweed pollen used therein. The final product was similar to and equally useful as that described in Example I.

*Example VIII*

The procedure described in Example I was repeated with the exception that 3 grams of orchard grass pollen were substituted for the 5 grams of high ragweed pollen used therein. The final product was similar to and equally useful as that described in Example I.

*Example IX*

The procedure described in Example I was repeated with the exception that ash tree pollen was substituted for the high ragweed pollen used therein. The final product was similar to and equally useful as that described in Example I.

*Example X*

The procedure described in Example I was repeated with the exception that 12 grams of oak tree pollen were substituted for the 5 grams of high ragweed pollen used therein, and that quinoline was substituted for pyridine in the extracting liquid. The final product was similar to and equally useful as that described in Example I.

*Example XI*

The procedure described in Example I was repeated with the exception that 3 grams of maple tree pollen were substituted for the 5 grams of high ragweed pollen used therein, and that lutidine was substituted for pyridine in the extracting liquid. The final product was similar to and equally useful as that described in Example I.

*Example XII*

The procedure described in Example I was repeated with the exception that 18 grams of a mixture of equal parts of high ragweed, low ragweed, timothy grass, orchard grass, beech tree and poplar tree pollen is substituted for the 5 grams of high ragweed pollen used therein. The final product was similar to and as useful as that described in Example I, and had the manifest advantage of multiple immunization and therapy.

*Example XIII*

The procedure described in Example I was repeated with the exception that 50 ml. of an aqueous solution containing 2 percent by weight of potassium alum were substituted for the 40 ml. of an 0.25 N sulfuric acid solution containing potassium alum, used therein. The final product was similar to and equally useful as that described in Example I.

*Example XIV*

The procedure described in Example VII was repeated with the exception that 50 ml. of an aqueous solution containing 2 percent by weight of potassium alum were substituted for the 40 ml. of an 0.25 N sulfuric acid solution containing potassium alum, used therein. The final product was similar to and equally useful as that described in Example VII.

*Example XV*

The procedure described in Example X was repeated with the exception that 50 ml. of an aqueous solution containing 2 percent by weight of potassium alum were substituted for the 40 ml. of an 0.25 N sulfuric acid solution containing potassium alum, used therein. The final product was similar to and equally useful as that described in Example X.

I wish it to be understood that I do not desire to be limited to the exact details of substances, proportions and process conditions described and illustrated by way of example, as modifications within the scope of the following claims may occur to workers in this field which would involve no departure from the spirit of this invention nor any sacrifice of the advantages thereof.

Having thus described the present invention, what I desire to secure by Letters Patent is set forth in the following claims.

I claim:

1. A method of preparing a water-insoluble pollen complex which comprises extracting the whole pollen material in a single extraction procedure with an extracting liquid consisting of an about 50% aqueous heterocyclic tertiary amine selected from the group consisting of pyridine, lutidine and quinoline, the aqueous component of said heterocyclic tertiary amine extracting liquid constituting a component selected from the group consisting of distilled water, 0.3% sodium bicarbonate solution, 0.9% sodium chloride solution, 5% dextrose solution, and N/10 sodium hydroxide solution, filtering the mixture thus obtained to recover the liquid extract containing the active material, adding water to this extract, precipitating a water-insoluble pollen complex by adding a dilute solution of potassium aluminum sulfate to the extract and recovering the precipitated complex containing the active physiological principles of the pollen.

2. A method as claimed in claim 1 wherein the precipitated complex is suspended in an isotonic salt solution.

3. A method as claimed in claim 1 wherein the pollen treated is ragweed pollen.

4. A method as claimed in claim 1 wherein the pollen treated is timothy grass pollen.

5. A method as claimed in claim 1 wherein the pollen treated is plantain pollen.

6. A method as claimed in claim 1, wherein the pollen treated is oak tree pollen.

7. A method as claimed in claim 1 wherein the pollen treated is maple tree pollen.

8. A method as claimed in claim 1 wherein the pollen treated is a mixture of different pollens.

9. The product made by the method of claim 1.
10. The product made by the method of claim 3.
11. The product made by the method of claim 4.
12. The product made by the method of claim 5.
13. The product made by the method of claim 6.
14. The product made by the method of claim 7.
15. The product made by the method of claim 8.

References Cited in the file of this patent

UNITED STATES PATENTS

| | | |
|---|---|---|
| 2,456,750 | Strauss | Dec. 31, 1948 |
| 3,071,508 | Strauss | Jan. 1, 1963 |

FOREIGN PATENTS

| | | |
|---|---|---|
| 527,803 | Great Britain | Oct. 16, 1940 |

OTHER REFERENCES

Brown: The Journal-Lancet, 1937, pages 97–100.
Cooke et al.: J. Allergy, vol. 4, page 87, 1933.
Sledge: U.S. Naval Med. Bulletin, January 1938, vol. 36.
Stull et al.: J. Allergy, vol. 4, 1933, page 455.
Todd: J. of Pharm. and Pharm., pages 625–641, October 1955, page 631 is especially pertinent.